April 27, 1943.  H. L. JOHNSON  2,317,615

COUNTERSINK STOP

Filed Nov. 28, 1941

INVENTOR.
HARRY L. JOHNSON
BY Hazard and Miller

ATTORNEYS.

Patented Apr. 27, 1943

2,317,615

UNITED STATES PATENT OFFICE 2,317,615

COUNTERSINK STOP

Harry L. Johnson, Los Angeles, Calif.

Application November 28, 1941, Serial No. 420,808

6 Claims. (Cl. 77—73.5)

This invention relates to a stop for countersinking tools.

A conventional countersinking tool now in general use comprises a cylindrical body having a tapered stem by which it is driven, the body being fluted from its bottom upwardly across the tapered lower portion of the tool which provides countersinking cutting edges with the flutes extending upwardly on the sides of the body. By this construction the tool may be frequently resharpened by grinding back the tapered lower portion of the tool, the flutes being continually present therein and providing not only advance clearance for the cutting edges but spaces for the chips or cuttings.

An object of the present invention is to provide a very simple and durable stop that is applicable to a countersinking tool of this character which will positively limit the depth to which the countersinking cut may be made regardless of axial forces that may be applied to the tool and which on application to the tool will always be properly positioned so as to properly limit the depth of cut regardless of the extent to which the tool may be ground back in resharpening.

It is also an object of the invention to provide a stop for conventional countersinking tools as above described, which has not only the above-mentioned characteristics, but which does not block the flutes or interfere with the removal of the chips or cuttings produced in the countersinking operation.

With the foregoing and other objects in view, which will be made manifest in the following detailed description and specifically pointed out in the appended claims, reference is had to the accompanying drawing for an illustrative embodiment of the invention, wherein:

Figure 1:
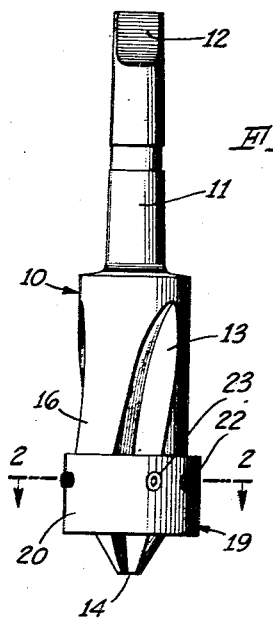
Figure 1 is a view in side elevation of a conventional countersinking tool illustrating the stop embodying the present invention as having been applied thereto.

Referring to the accompanying drawing wherein similar reference characters designate similar parts throughout, the conventional countersinking tool comprises a cylindrical body 10 on which is formed a stem or shank 11 usually tapered and flatted at its upper end as indicated at 12. The tool usually has three relatively deep grooves or flutes 13 formed therein which extend from the bottom 14 up across the tapered lower portion of the tool 15 and along the major portion of the length of the cylindrical body. These flutes leave between them cylindrical exterior surfaces 16 on the body of the tool and conical tapered surfaces 17 on the tapered lower portion. The cutting edges that perform the countersinking cutting are indicated at 18.

Tools of this character are used for a number of various countersinking operations. In countersinking rivet or bolt holes in steel plates, such as are used in ship building, it is desirable to form a very positive stop that will limit the depth to which the countersinking is done.

The stop that embodies the present invention comprises a relatively short cylindrical steel sleeve 19 arranged to telescope over the lower portion of the body. This sleeve has its lower end internally thickened as indicated at 20 to present a conical internal surface 21 complementary to the conical surface 17 on the tapered lower portion 15 of the tool. In the sleeve 19 there are drilled and tapped holes which receive set screws 22. These are arranged near the top of the sleeve and are designed to be tightened against the cylindrical surfaces 16 between the flutes 13 to hold the stop from dropping off of the countersinking tool. An additional set screw 23 is also mounted on the sleeve and is arranged to extend into one of the flutes 13 so as to lock the sleeve against rotation on the countersinking tool.

During countersinking operations that portion of the lower end of the tool that extends downwardly below the bottom surface 24 of the sleeve is allowed to cut the hole that is to be countersunk. The cutting action continues until the surface of the plate or other material being worked on engages the surface 24 at which time further or deeper countersinking is prevented.

As the sleeve or ring 19 bears on each of the conical surfaces 17 it is manifest that the sleeve cannot be forced upwardly on the tool regardless of the downward or axial forces applied to the stem or shank 11. Consequently, the sleeve forms a very positive and accurate stop that limits the depth of the countersinking operation.

The countersinking tool must of course be resharpened from time to time, and when this is necessary the set screws 22 and 23 are loosened and the sleeve slipped off of the tool. The tool is ground in the conventional manner to accomplish the resharpening which involves a grinding back of the conical surfaces 17. Regardless of the extent to which these surfaces may be ground back when the sleeve 19 is reapplied it is forced onto the tool until its conical internal surface 21 engages the conical surfaces 17 between the flutes 13. In this manner regardless of the extent to which the tool may be ground back in resharpening the sleeve will always be repositioned with respect to the surfaces 17 so as to limit the countersinking operation to the same depth.

Figure 2:
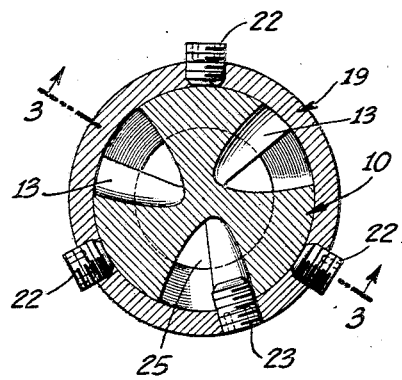
Fig. 2 is a horizontal section taken substantially upon the line 2—2 upon Fig. 1.
Figure 3:
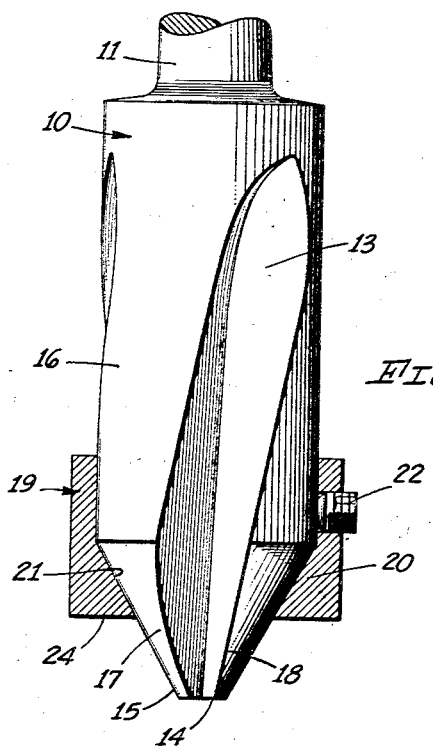
Fig. 3 is a view taken substantially upon the line 3—3 upon Fig. 2; the lower portion of the countersinking tool being illustrated in elevation.

It will be noted that except for the set screws 23 no portion of the stop enters the flutes 13 leaving the lower ends of the flutes open as indicated at 25, see Fig. 2, for the passage of cuttings and chips through the flutes.

Figure 4:
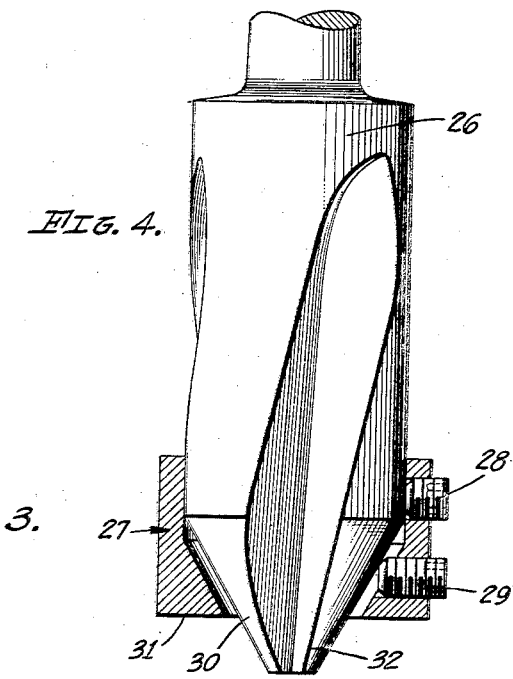
Fig. 4 is a view similar to Fig. 3, but illustrating a slightly modified form of construction that may be employed.

In Fig. 4 there is illustrated a slightly modified form of construction wherein the conventional countersinking tool, as above described, is indicated at 26. The sleeve or collar 27 is similar in construction to the sleeve 19 having the set screws 28 corresponding to the set screws 22 and an additional set screw, not shown, which corresponds to the set screws 23 that enters one of the flutes to prevent rotation. In addition to these set screws there are set screws 29 extending into drilled and tapped holes adjacent the lower end of the sleeve or collar. These set screws are so arranged as to have their inner ends engageable with the conical surfaces 30 corresponding to the conical surfaces 17 on the lower portion of the tool. By adjusting the set screws 29 outwardly or inwardly the relationship between the bottom surface 31 and the cutting edges 32 can be varied. Thus, the construction shown in Fig. 4 provides an adjustable stop for variably limiting the depth to which the countersinking cut may be made.

In this construction as before on resharpening the tool the sleeve or collar 27 is removed by loosening set screws 28. Set screws 29 are left undisturbed unless a change of adjustment is desired. The tool is sharpened and the collar reapplied. The telescoping movement of the collar onto the tool is limited by the reengagement of the set screws 29 with the conical surfaces 30.

From the above-described constructions it will be appreciated that an improved countersinking stop is provided that is applicable to the conventional fluted countersinking tool. It can be easily and quickly applied and when applied, will assume the proper position to limit the depth of the countersinking operation. This limit is automatically and accurately maintained regardless of the extent to which the tool may be ground back in resharpening inasmuch as it is merely necessary to slip the collar or sleeve onto the tool as far as it will go and then tighten the set screws that hold the collar from slipping off of the tool and which lock it against rotation relatively thereto.

Various changes may be made in the details of construction without departing from the spirit or scope of the invention as defined by the appended claims.

I claim:

1. A stop for countersinking tools comprising a cylindrical sleeve capable of telescoping over the body of a countersinking tool, said sleeve having at its bottom an internal contraction adapted to engage the tapered lower end of the countersinking tool, means on the sleeve engageable with the sides of the countersinking tool between the flutes thereof to hold the sleeve onto the tool, and means on the sleeve arranged to enter one of the flutes of the tool to lock the sleeve against rotation thereon.

2. A stop for countersinking tools comprising a cylindrical sleeve capable of telescoping over the body of a countersinking tool, said sleeve having at its bottom an internal contraction adapted to engage the tapered lower end of the countersinking tool, set screws on the sleeve adapted to be tightened against the sides of the tool between the flutes thereof, and an additional set screw adapted to be screwed so as to enter one of the flutes to prevent rotation of the sleeve thereon.

3. In combination with a countersinking tool having flutes extending upwardly from the bottom of the tool through the tapered lower portion thereof and onto the cylindrical sides thereof, a stop comprising a sleeve adapted to telescope onto the tool and encircle the same having parts that bear against the sides of the tapered lower portion of the tool between the flutes thereof limiting upward movement of the sleeve relatively thereto, and means for holding the sleeve onto the tool against rotation relatively thereto.

4. In combination with a countersinking tool having flutes extending upwardly from the bottom of the tool through the tapered lower portion thereof and onto the cylindrical sides thereof, a stop comprising a sleeve adapted to telescope onto the tool and encircle the same having parts that bear against the sides of the tapered lower portion of the tool between the flutes thereof limiting upward movement of the sleeve relatively thereto, set screws on the sleeve adapted to be tightened against cylindrical sides of the tool between the flutes thereof, and an additional set screw on the sleeve adapted to be screwed into one of the flutes.

5. A stop for countersinking tools comprising a cylindrical sleeve capable of telescoping over the body of a fluted countersinking tool, means for holding the sleeve onto the tool and against rotation relatively thereto, and adjustable means on the lower end of the sleeve engageable with the tapered lower portion of the tool between the flutes thereof to limit upward movement of the sleeve with respect to the tool.

6. A stop for countersinking tools comprising a cylindrical sleeve capable of telescoping over the body of a fluted countersinking tool, set screws on the upper end of the sleeve adapted to be tightened against the cylindrical sides of the tool between the flutes thereof to hold the sleeve onto the tool, an additional set screw adapted to be screwed into one of the flutes, and set screws on the lower end of the sleeve having their inner ends arranged to engage the tapered or conical lower surfaces of the tool between the flutes thereof.

HARRY L. JOHNSON.